Nov. 25, 1958    E. H. MUELLER    2,861,467

OPERATING STEM FOR GAS VALVE

Filed June 20, 1955

INVENTOR.
ERVIN H. MUELLER
BY
Barnes, Kisselle, Laughlin & Raisch
ATTORNEYS.

United States Patent Office 2,861,467
Patented Nov. 25, 1958

2,861,467

OPERATING STEM FOR GAS VALVE

Ervin H. Mueller, Grosse Pointe, Mich.

Application June 20, 1955, Serial No. 516,499

5 Claims. (Cl. 74—504)

This invention relates to valves for controlling the flow of gas to gas burning equipment and it has to do especially with the construction of an operating stem.

In modern equipment, particularly of the domestic type, the valve bodies are usually concealed within a covering panel. The valve stems project through the panel and are equipped with handles or knobs outside of the panel. The situation gets difficult when the distance between the valve body and the enclosing panel varies. This situation is particularly present in equipment made in accordance with the current trend wherein gas burning equipment such as ovens or the like are concealed behind walls, panels or partitions of cabinets or counters which are designed and built to order to fit the particular area. The builder mounts the burning equipment with respect to the panel, cabinet, counter or the like may vary the distance between the valve and the panel and then, too, the position of the panel may vary since it may be installed by a carpenter or other workman and its position varied with respect to the valve or valves.

It is an object of this invention to provide an improved valve operating stem structure which may be used with a valve with a standard stem and which may be adjusted to vary the length of the overall operating stem so that a standard valve may be employed in numerous situations where the position of the valve body and the enclosing panel are different.

Structures made in accordance with the invention are shown in the accompanying drawings.

Figure 1:
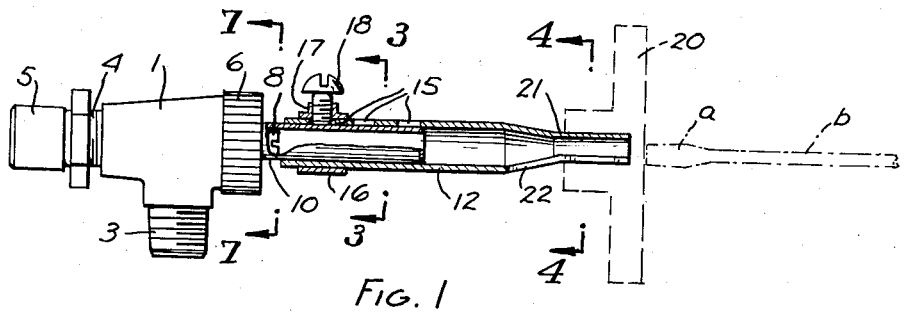
Fig. 1 is a view partly in side elevation and partly in section illustrating one structure.

The valve shown in Fig. 1 may be of any conventional structure of single outlet or double outlet design. It has a body 1 with a screw threaded extension 3 which is hollow and which is to be threaded into a gas supply pipe. There is a threaded extension 4 provided with a hood at 5 which has an outlet orifice. Within the body is a rotatable valve member and the valve member has ports and passages arranged to connect and disconnect the inlet and outlet passages of the valve body. The body is equipped with a suitable cap 6. Such valves are well known to those versed in the art and the specific porting and arrangement forms no part of this invention.

Figure 7:
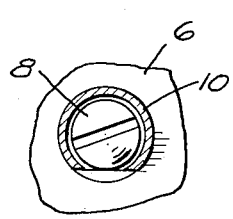
Fig. 7 is a sectional view taken on line 7—7 of Fig. 1 showing the valve stem.

Projecting through the cap 6 is a valve stem 10. The stem shown is of hollow form as shown in Fig. 7 and it is machined on one side so that it is generally of D-shape in cross section. The hollow stem is provided so that a tool, such as a screw driver, may be passed into the stem to turn a screw 8 for making a fine adjustment for the flow of gas through the valve member in order to adjust for a proper flame such as a low flame or simmer flame.

Figure 3:
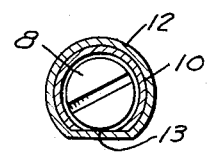
Fig. 3 is a cross sectional view taken on line 3—3 of Fig. 1 illustrating the interfitting of the valve stem and an extension element.

The extension, as shown in Fig. 1, is of tubular form. The extension is generally illustrated at 12 and it is preferably fashioned from sheet metal with opposite edges abutting as at 13 but not necessarily secured together. The tubular body of the extension 12 is D-shape in cross section as will be seen by reference to Fig. 3 and the interior dimensions are such that it fits snugly over the stem 10.

Figure 5:
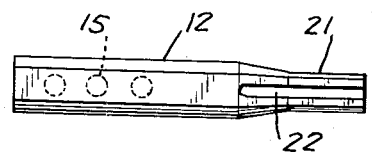
Fig. 5 is an elevational view of an extension

The extension 12 is provided with a plurality of apertures 15, three of which are shown in Fig. 5. The apertures are preferably positioned diametrically opposite the flat side of the extension. A retainer ring 16 is formed with a flat side and so that it fits over the extension 12. This retainer ring is formed with a projection or integrally extruded part 17 which is long enough to receive internal threads for the reception of a binding screw 18. When the extension is applied to the stem 10 the collar is positioned so that the screw 18 passes through one of the apertures 15 and can thus be tightened against the stem 10 to secure the extension thereto.

It will be seen by reference to Fig. 1 that the extension may be applied to the stem 10 in several positions of axial adjustment. Moreover, the collar 16 and screw 18 may be placed in any one of three positions in a single position of adjustment of the extension 12. Thus the collar and screw may be varied as to position in order to make the screw accessible with reference to other obstructions which may be present. Furthermore, the extension 12 may be cut off at its inner end to vary its overall length where such is necessary. For instance, and for example, the inner end of extension 12 may be cut off far enough back to remove the innermost aperture thus leaving two apertures, and in this way the overall length of the entire composite operating stem may be shortened.

Figure 4:
Fig. 4 is a cross sectional view taken on line 4—4 of Fig. 1 illustrating structure of the extension.
Figure 6:
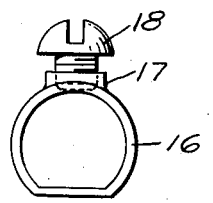
Fig. 6 is a view illustrating a retainer element.

As stated above, the stem is to project through an aperture in a covering partition or the like and to receive a handle as indicated at 20. For this purpose, the hollow extension 12 has an ensmalled outer end portion as shown at 21 in Fig. 4. This end is of D-shape in cross section and of a size in cross sectional dimensions substantially the same as the stem 10. Accordingly, a handle which is applicable to the stem 10 is also applicable to the end portion 21. The end 21 is preferably provided with a relatively wide slot 22. This is for the purpose of facilitating the entrance of a tool such as a screw driver so that it may be passed into the hollow extension 12 and hollow stem 10 and applied to the adjusting screw 8. As is well known the head of the conventional screw driver is flattened and has a greater cross dimension as at *a* than does the shank *b*. The head *a* may be moved partially through the slot 22 until it is within the enlarged part of the extension. Therefore, the slot 22 may terminate at the large diameter of the body of the extension 12.

Figure 2:
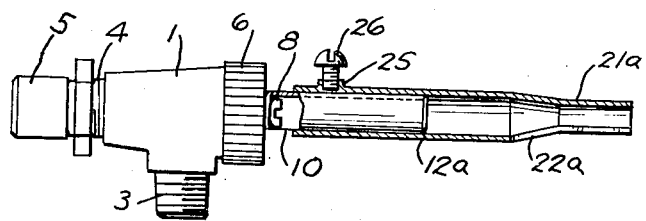
Figure 2 is a similar view illustrating another structure.

In the form shown in Fig. 2 the parts of the valve are the same with the same reference character applied and similar parts of the extension carry the same reference characters with the addition of the letter *a*. In this form the clamping sleeve 16 is omitted and the tubular extension 12*a* is provided with a portion fashioned from upset metal 25 and internally threaded for receiving a clamping screw 26.

I claim:

1. In a valve for controlling gas having a valve stem of hollow form and a member accessible through the hollow stem for adjustment purposes, a hollow extension having a body portion for slidably fitting upon said hollow stem, means operable to fix the hollow extension in selected positions on the stem, the extension having an end portion of relatively small cross dimensions and adapted to receive a handle, said relatively small end portion having an elongate open slot extending lengthwise and adapted to permit passage therethrough of a tool, such as a screw driver, so that the tool may be applied to said member.

2. In a valve for controlling gas having a valve stem of hollow form and a member accessible through the hollow stem for adjustment purposes, said valve stem being of D-shape in cross section, a hollow extension having a body portion of D-shape in cross section for slidingly fitting upon said stem, said extension having a plurality of axially spaced apertures substantially diametrically opposite the flat side of the D thereof, a collar for fitting over the body portion and having an internally threaded part for selective alignment with the apertures in the body portion, a binding screw in said threaded portion and adapted to be passed through and to bind against the stem so that said hollow extension can be fixed in selected positions on the stem, the hollow extension having a relatively small end portion of D-shape in cross section and adapted to receive a handle, said end portion having an elongate axially extending slot disposed in the flat side of its D-shape and adapted for the passage therethrough of a tool, such as a screw driver, whereby the tool may be passed through the hollow extension and hollow stem and applied to said member to make adjustments thereof.

3. In a valve for controlling gas having a valve stem of hollow form and a member accessible through the hollow stem for adjustment purposes, a hollow extension having a body portion for slidably fitting upon said hollow stem, means operable to fix the hollow extension in selected positions on said stem, said extension having an end portion of relatively small cross dimensions and adapted to receive a handle, said extension having an intermediate portion extending angularly between said body portion and said end portion, said relatively small end portion and said intermediate portion having an elongate open slot extending lengthwise of said extension and being adapted to permit passage therethrough of a tool, such as a screw driver, so that the tool may be applied to said member.

4. In a valve for controlling gas having a valve stem of hollow form and a member accessible through the hollow stem for adjustment purposes, a hollow extension having a body portion for slidably fitting upon said hollow stem, means operable to fix the hollow extension in selected positions on the stem, the extension having an end portion of relatively small cross dimensions and adapted to receive a handle, said relatively small end portion having an elongate open slot extending lengthwise and adapted to permit passage therethrough of a tool, such as a screw driver, so that the tool may be applied to said member, said means including a plurality of axially spaced apertures in said body portion, a collar fitting over said body portion and having an internally threaded part for selective alignment with said apertures and a binding screw in said threaded portion adapted to be passed through and to bind against the stem so that said hollow extension can be fixed in selected positions on the stem.

5. In a valve for controlling gas having a valve stem of hollow form and a member accessible through the hollow stem for adjustment purposes, a hollow extension having a body portion for slidably fitting upon said hollow stem, means operable to fix the hollow extension in selected positions on the stem, the extension having an end portion of relatively small cross dimensions and adapted to receive a handle, said relatively small end portion having an elongate open slot extending lengthwise and adapted to permit passage therethrough of a tool, such as a screw driver, so that the tool may be applied to said member, said means including an aperture in said body portion and a binding screw threaded into and being adapted to pass through said aperture to bind against the stem so that said hollow extension can be fixed in selected positions on the stem.

References Cited in the file of this patent

UNITED STATES PATENTS

| | | |
|---|---|---|
| 1,639,885 | Gammeter | Aug. 23, 1927 |
| 2,015,918 | Brabant | Oct. 1, 1935 |
| 2,530,215 | Zidar | Nov. 14, 1950 |
| 2,552,102 | Lyons | May 8, 1951 |
| 2,632,467 | Lamar | Mar. 25, 1953 |
| 2,651,281 | Nathan | Sept. 8, 1953 |
| 2,652,225 | Peterson et al. | Sept. 15, 1953 |
| 2,658,411 | Eversman | Nov. 10, 1953 |

FOREIGN PATENTS

| | | |
|---|---|---|
| 640,390 | Great Britain | July 19, 1950 |